United States Patent [19]

Thompson et al.

[11] 4,311,226

[45] Jan. 19, 1982

[54] TRAPPED-AXLE CONVEYOR ROLL

[75] Inventors: Glen L. Thompson, Newman Lake; Joe W. Way, Jr., Spokane, both of Wash.

[73] Assignee: Gifford-Hill & Company, Inc., Spokane, Wash.

[21] Appl. No.: 117,220

[22] Filed: Jan. 28, 1980

[51] Int. Cl.³ .............................................. B65G 39/02
[52] U.S. Cl. ............................... 193/35 R; 29/116 R; 193/37
[58] Field of Search ....................... 198/780, 824, 842; 193/37, 35 R; 308/20; 29/116 R

[56] References Cited

U.S. PATENT DOCUMENTS

| | | | |
|---|---|---|---|
| 1,503,920 | 8/1924 | Schneebeli | 308/20 |
| 1,829,189 | 10/1931 | Schroeder | 308/20 |
| 1,882,480 | 10/1932 | Brueshaber | 29/116 R |
| 1,919,495 | 7/1933 | Allen | 193/37 |
| 1,943,998 | 1/1934 | Adams | 193/37 |
| 1,946,024 | 2/1934 | Lamatsch | 29/116 R X |
| 2,607,459 | 8/1952 | Ludwig et al. | 193/37 |
| 2,779,639 | 1/1957 | Bainbridge | 308/20 X |
| 3,246,216 | 4/1966 | Mead et al. | 193/37 X |
| 3,353,644 | 11/1967 | McNash et al. | 193/37 |
| 3,361,491 | 1/1968 | Nowisch | 308/20 |
| 3,669,243 | 6/1972 | Fischbacher | 193/37 X |

FOREIGN PATENT DOCUMENTS

| | | | |
|---|---|---|---|
| 1809714 | 10/1969 | Fed. Rep. of Germany | 198/842 |
| 548981 | 11/1942 | United Kingdom | 198/842 |

*Primary Examiner*—James L. Rowland
*Attorney, Agent, or Firm*—James L. Jackson

[57] ABSTRACT

A conveyor frame and conveyor roll assembly comprising spaced conveyor frame elements defining opposed, noncircular axle receiver slots or openings, as the case may be. A conveyor roll and axle assembly includes a conveyor axle formed of cylindrical stock, such as tubing, and having the extremities thereof formed to a noncircular configuration adapted to be received in nonrotatable relation by the axle receiver slots or openings and defining a cylindrical intermediate portion having stop surfaces at each extremity thereof. Bearings are provided having inner and outer bearing races and rotatable bearings therebetween. The inner race of each of the bearings is received in nonrotatable relation with the noncircular extremities of the conveyor roll axle and is adapted to be engaged by the stop surfaces of the axle to limit axle movement relative thereto. A tubular roll element is provided and the outer portions of each of the bearings is positioned in nonrotatable relation within the extremities of the roll element for drop-in type axle installation the noncircular extremities of the axle may be of the same length. For free-hole type installation, one of the noncircular extremities of the axle is of greater length than the other extremity enabling the axle to be moved through the receptacle hole of the conveyor frame sufficiently to allow the opposite extremity of the axle to be inserted into the hole receptacle of the opposite frame member.

3 Claims, 8 Drawing Figures

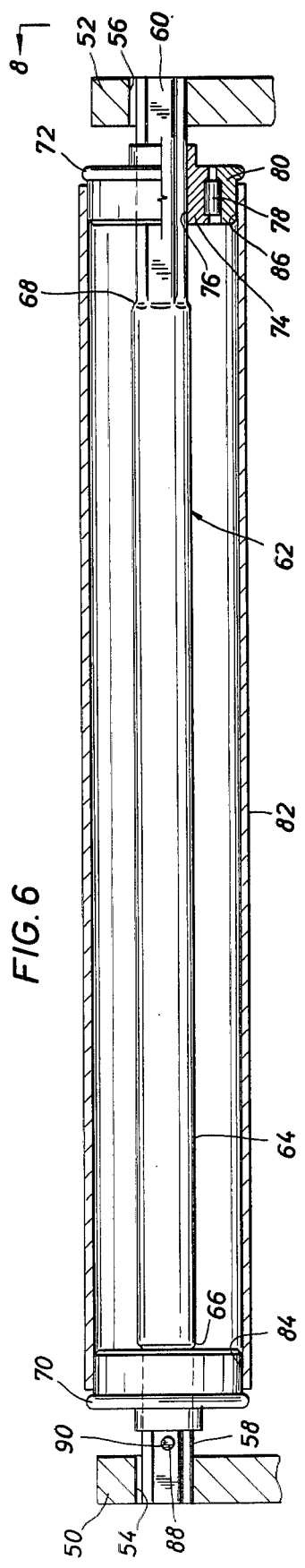
FIG.6
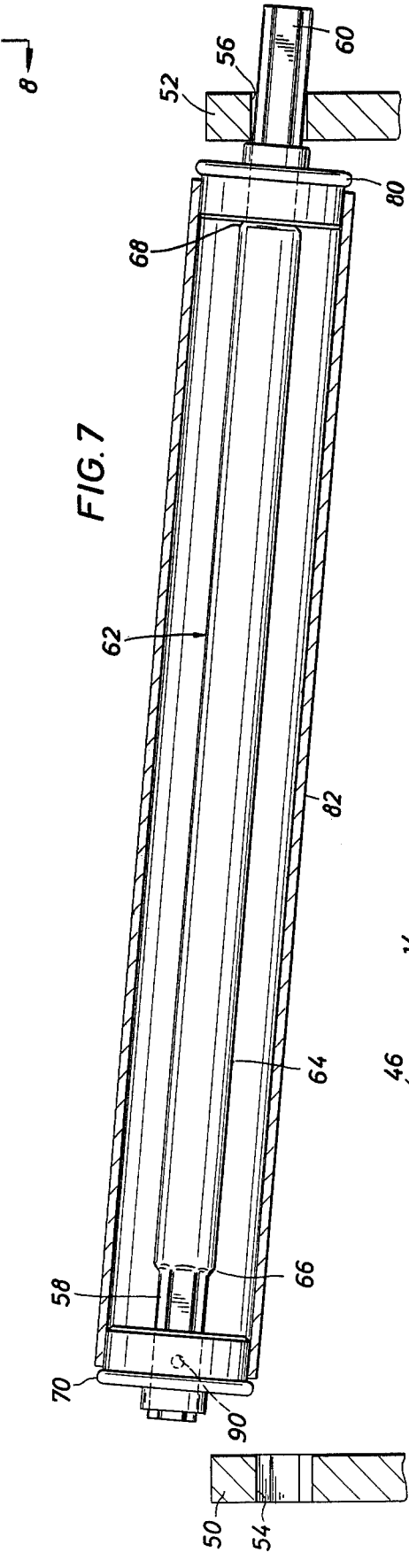
FIG.7
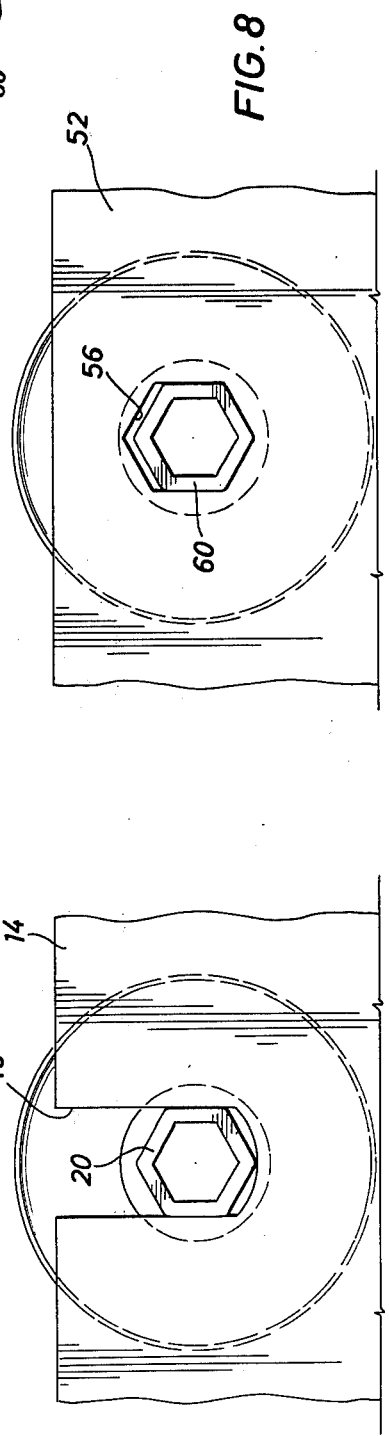
FIG.8
FIG.5

TRAPPED-AXLE CONVEYOR ROLL

FIELD OF THE INVENTION

This invention relates generally to conveyor systems and, more particularly, relates to conveyor roll structures that are adapted to be positioned in supported relation by means of a pair of spaced conveyor frame members. Even more specifically, the present invention relates to a trapped-axle arrangement between the conveyor roll axle and end bearings that function to limit axial movement of the axle member and thereby simplifies the necessary structure of the conveyor system.

BACKGROUND OF THE INVENTION

Conveyor mechanisms of the nonpowered type are basically rather simple in design and typically incorporate a conveyor frame structure defining a pair of spaced conveyor frame members having conveyor axle support receptacles formed therein. These axle support receptacles may conveniently take the form of elongated slots allowing drop-in type installation of conveyor rolls or, in the alternative, may take the form of noncircular apertures that enable the establishment of a nonrotatable relation between conveyor roll axles and the conveyor frame members. Typical conveyor roll structure includes a tubular conveyor roll element that may conveniently take the form of metal tubing having a bearing member received at each extremity thereof and establishing a friction tight or mechanically interconnected relationship therewith. The bearing structure typically incorporates inner and outer bearing races having bearing rollers or balls therebetween. The inner race of the bearing is formed to define a noncircular opening, typically of hexagonal configuration that is adapted to establish a nonrotatable interfitting relation with a conveyor axle extending therethrough. Typically, a conveyor axle is formed from a length of solid hexagonal stock and is typically received in slidable relation within the aperture of the inner bearing race. Obviously, in order to limit axial movement of the conveyor roll and bearing relative to the conveyor axle, a suitable retainer stop must be provided. In most cases, a simple stop pin is inserted through a transverse bore formed in the conveyor axle after the conveyor roll, bearing and axle have been installed in the conveyor frame. In some cases, axial movement of a conveyor axle is limited by providing an additional stop plate member at the outside of each conveyor frame, thereby closing the openings or slots within which the extremities of the axle are received. Providing additional stop plate members simply for the purpose of limiting axial movement of the various conveyor rolls is obviously an expensive procedure and detracts from the commercial feasibility of such conveyor mechanisms.

Typical conveyor roll assemblies, incorporating hexagonal axles are difficult to assemble and maintain in assembly during installation. As assembled, the hexagonal shaft or axle is free to move axially within the bearings at the extremities of the conveyor roll, and one must take great care to insure that one end of the axle does not move completely through the respective bearing and become disassembled from the inner race of the bearing. It is difficult and frequently requires considerable labor to rethread the hexagonal axle extremity through the mating opening of the inner race particularly when quite long conveyor rolls are being assembled and installed.

After a conveyor roll shaft and bearing assembly has been assembled, the assembly can be applied to a conveyor frame section in one of two ways. The first method of assembly is termed a "drop-in" application wherein the hexagonal axle shaft is merely dropped into two opposing axle slot receptacles that establish a nonrotatable relation between the axle and the conveyor frame, thus preventing the hexagonal conveyor axle from rotating during use.

The other type of application for conveyor roll assemblies of this nature is referred to as the "free-hole" type, wherein the conveyor side frames are punched or otherwise formed to define noncircular openings to receive mating noncircular axle ends of the various conveyor roll assemblies. Particularly, the conveyor frames are formed, typically by a punching operation, to define conveyor axle hole receptacles that are of hexagonal configuration so as to receive the hexagonal extremities of the conveyor axles thereof.

During installation, the extremities of the conveyor axles are threaded through the receptacle holes of the conveyor frames in order to install the conveyor roll assemblies. In order to accomplish assembly, the hexagonal shaft defining the axle must be pulled into the bearing on one end of the roller assembly; that end of the roller must be placed at a hexagonal hole and moved linearly sufficiently that the axle shaft comes within the bearing on the opposite extremity of the roll. This allows that extremity of the roll to be placed near the hexagonal hole receptacle of the other side frame member, after which the hexagonal shaft can be moved back through the conveyor roll in the opposite direction causing the opposite axle end to enter the hole receptacle of the frame.

After the conveyor roll assembly has been installed in this manner, it is necessary to provide suitable means for preventing the hexagonal axle shaft from moving linearly relative to the bearings and becoming inadvertently disassembled therefrom. One suitable means for limiting axial movement of the axle shaft relative to the conveyor roll is accomplished by locating a stop pin in the axle shaft, thus preventing the axle shaft from moving in either direction far enough to become disassembled from the axle receptacles of the conveyor frame. A considerable amount of labor and expense can be necessary for installation of conveyor systems of this nature, and it is therefore desirable to provide an improved conveyor system that effectively limits the amount of labor required during assembly.

As mentioned above, typical conveyor axles are formed from elongated hexagonal stock. This stock is typically solid bar stock, is quite heavy and expensive due to the amount of material required for the hexagonal stock. It is therefore desirable to provide an axle structure of light-weight and inexpensive construction without in any way sacrificing the standpoint of strength and function of the axle structure.

In view of the foregoing, it is a primary object of the present invention to provide a novel trapped-axle type conveyor frame and conveyor roll assembly incorporating an axle that is formed of light-weight and strong tubular construction and thereby reduces the amount of material necessary for forming the axle structure.

It is also a feature of the present invention to provide a novel trapped axle type conveyor frame and conveyor roll assembly wherein an axle structure is defined by tubular stock of cylindrical configuration, having the end portions thereof deformed by swedging or by other suitable means in order to define noncircular axle extremities adapted to be retained in nonrotatable relation within conveyor bearings and conveyor frame receptacles.

It is another novel feature of the present invention to provide a trapped-axle type conveyor frame and conveyor roll assembly wherein an axle structure is defined that forms intermediate stop surfaces functioning in conjunction with bearing elements to limit axial movement of the conveyor roll axle relative to the bearings and roll structure, thus trapping the conveyor axle without necessitating provision of additional stop elements as in the case of conventional conveyor roll assemblies.

It is another important feature of the present invention to provide a novel trapped axle type conveyor frame and conveyor roll assembly that may be readily and simply installed without requiring tedious threading of the conveyor axle structure within conveyor bearings in order to accomplish installation of the conveyor roll systems within conveyor side frames.

It is an even further feature of the present invention to provide a novel trapped-axle type conveyor frame and conveyor roll assembly that is of simple nature, is reliable in use and low in cost.

Other and further objects, advantages and features of this invention will become apparent to one skilled in the art upon an understanding of the illustrative embodiments about to be described, and various advantages, not referred to herein, will occur to one skilled in the art upon employment of the invention in practice.

SUMMARY OF THE INVENTION

The present invention is directed to the provision of an improved, trapped-axle type conveyor frame and conveyor roll assembly wherein a conveyor frame structure may be provided having the opposed conveyor axle slot receptacles for drop-in type application or conveyor axle aperture receptacles for free-hole type installation of conveyor roll assemblies within the conveyor side frames. At least one, and preferably both of the conveyor side frames are formed with axle receptacles of a configuration that allows the establishment of a nonrotatable relation between a conveyor axle and the conveyor side frame.

Each conveyor axle is formed from cylindrical and preferably tubular stock and at least one and preferably each extremity of the axle member is formed of noncircular configuration that is appropriate to establish a nonrotatable relationship with the aperture or slot receptacle of the respective side frame members. The undeformed intermediate portion of each of the axles defines stop portions at each extremity thereof that function to restrict axle movement in either axial direction.

A pair of bearings are provided, each having inner and outer bearing races with rotary elements such as rollers or balls establishing a rotatable relationship between the inner and outer races of the bearings. The inner race of each of the bearings is formed to define a noncircular opening of mating relationship with the noncircular extremities of the axle shaft. Typically, the axle shaft is formed to define a hexagonal configuration and the inner races of the bearings are formed to define hexagonal openings that interfit with the extremities of the axle. A tubular roll element is provided having each extremity thereof adapted to receive the outer race portion of each of the bearings so as to establish a nonrotatable relation between the outer race and the tubular roll element. With the bearings in place within the tubular roll element, the stop surfaces at each extremity of the intermediate portion of the conveyor axle is located in closely spaced relationship with the inner portion of the respective inner race of the bearings. After slight movement of the axle in either axial direction relative to the bearings, the stop surfaces will engage the inner races of the bearings and will prevent further axial movement. Thus, the conveyor axle becomes trapped by the bearing structures and is allowed only limited axial movement relative thereto.

In order to facilitate free-hole type application of conveyor roll assemblies to conveyor frames, a certain degree of axle movement relative to the bearings and roll structure is necessary to permit lengthwise insertion movement of the extremities of the axle into the noncircular apertures of the opposed side frame members. This feature is effectively accomodated by forming one of the noncircular extremities of the axle of greater length than the length of the opposite axle extremity. The additional length of one of the extremities need only be sufficiently long to allow linear movement of the opposite axle extremity sufficiently into its bearing to allow the extremity of the axle shaft to be positioned in registry with the receptacle aperture of the opposite side frame. The axle may then be shifted laterally or axially with respect to the bearings and roll structure thereby causing insertion of the opposite axle extremity into the aperture of the opposite side frame member. After this has been accomplished, a stop pin may be inserted through an aperture defined in the shorter axle extremity, thereby preventing subsequent axle movement that might otherwise cause inadvertent disassembly of an axle extremity from one of the side frames.

BRIEF DESCRIPTION OF THE DRAWINGS

In order that that the manner in which the above-recited advantages and objects of the pressent invention, as well as others which will become apparent are attained and can be understood in detail, more particular description of the invention, briefly summarized above, may be had by reference to the specific embodiments thereof which are illustrated in the appended drawings, which drawings form a part of this specification. It is to be understood, however, that the appended drawings illustrate only typical embodiments of the invention and are therefore not to be considered limiting of its scope, for the invention may admit to other equally effective embodiments.

In the Drawings:

FIG. 5 is an end view taken along line 5—5 of FIG. 1 and illustrating drop-in application of a conveyor roll assembly to a conveyor side frame structure.

FIG. 6 is a sectional view of a conveyor frame and trapped-axle type conveyor roll assembly according to the present invention and representing a modified embodiment of the present invention adapted for free-hole type application to conveyor side frame structures.

FIG. 7 is an operational view illustrating the manner of assembling the conveyor roll structure of FIG. 6 to the side frame structures.

FIG. 8 is an end view taken along line 8—8 of FIG. 6 and illustrating the free-hole type assembly of the conveyor axle within the axle aperture of the conveyor side frame.

DESCRIPTION OF PREFERRED EMBODIMENTS

Figure 1:
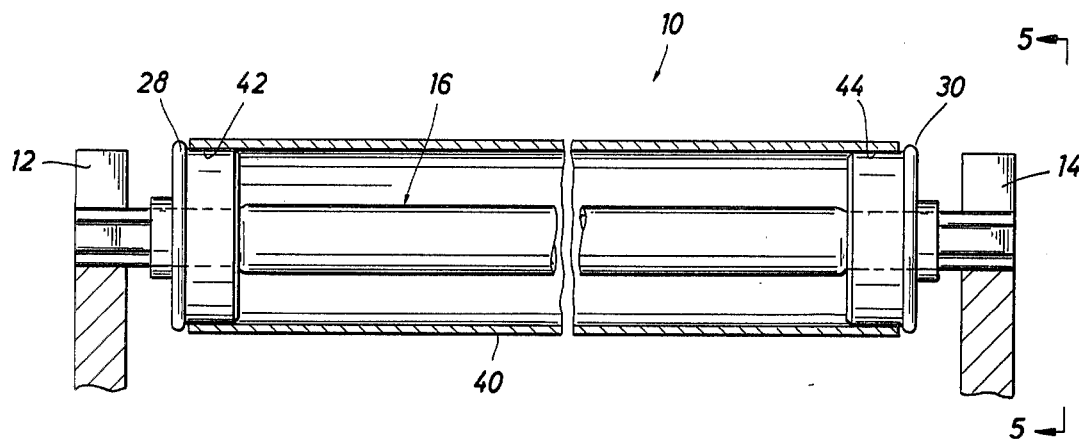
FIG. 1 is a sectional view of a trapped-axle type conveyor frame and roll assembly constructed in accordance with the present invention.

Referring now to the drawings and first to FIG. 1, there is shown a trapped-axle type conveyor frame and conveyor roll assembly generally at 10 where the conveyor frame structure is shown to be defined in part by a pair of side frame members 12 and 14 that are positioned in spaced relationship. Support for the conveyor roll assembly relative to the conveyor side frame members 12 and 14 is established by means of a conveyor axle illustrated generally at 16 and shown separated from the conveyor roll structure in FIG. 2 in order to facilitate ready understanding of the present invention. The conveyor roll axle 16 is formed from tubular stock having a cylindrical outer periphery with the tubular stock being swedged or otherwise formed at each extremity thereof to define end portions 18 and 20 that are of noncircular configuration. Specifically, the end portions 18 and 20 of the axle structure are of hexagonal configuration as shown particularly in FIG. 3, but this particular configuration is not intended to limit the present invention in any manner whatever, it being obvious that noncircular axle end portions or other suitable configuration may be employed within the spirit and scope of the present invention. Although end portions 18 and 20 of the axle structure are discussed herein as being swedged, such method of manufacturing the axles is not intended to limit the present invention. The end portions of the tubular stock may be deformed in any other suitable manner such as by machining or the like to provide appropriate noncircular extremities of the axle structure. Forming the noncircular extremities 18 and 20 provides the axle structure 16 with an elongated intermediate portion 22 of generally cylindrical configuration with the extremities of the intermediate portion defining stop surfaces 24 and 26, the purpose of which will be discussed hereinbelow.

Figure 4:
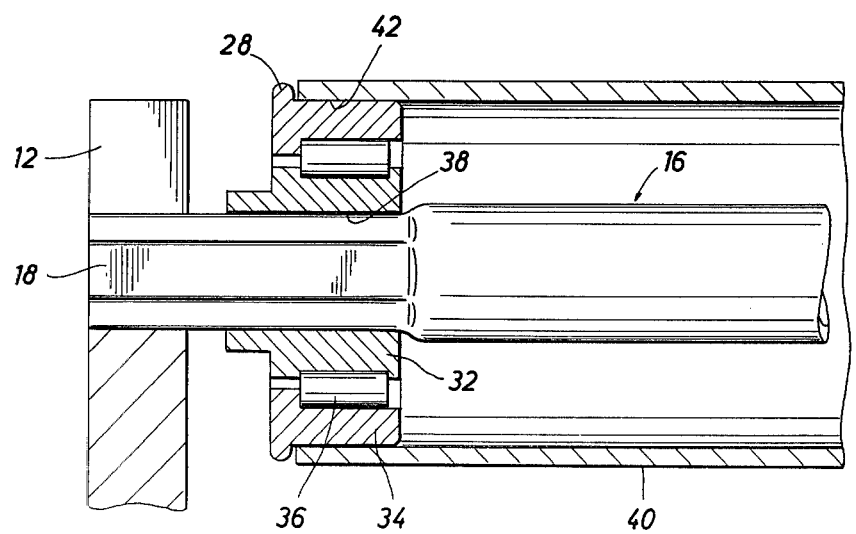
FIG. 4 is a fragmentary sectional view illustrating one extremity of the conveyor frame and conveyor roll assembly of FIG. 1 in detail.

The conveyor roll assembly also incorporates a pair of bearing structures 28 and 30 which, as shown in FIG. 4, define inner and outer bearing races 32 and 34, respectively, having bearing ball elements 36 positioned between the bearing races and functioning to establish a rotatable relationship between the bearing races. Obviously, it is intended that other bearing structures of different type may be employed within the spirit and scope of the present invention. Accordingly, it is intended that the particular bearing structure shown not in any way be restrictive of the present invention. The inner bearing race 32 is formed to define a noncircular opening 38 that is of a configuration mating with the configuration of the respective extremities of the conveyor axle structure 16. As shown in the drawings, the inner race 32 of the bearing structure is formed to define a hexagonal opening that establishes a nonrotatable relation with the hexagonal extremity of the conveyor axle.

A tubular roll element 40 is also provided having the end portions 42 and 44 thereof adapted to receive the outer bearing race 34 of the respective bearings in tightly fitting, nonrotatable relation therein.

Assembly of the trapped axle, drop-in type conveyor roll structure of FIG. 1 to the conveyor frame structure is accomplished by extending the conveyor axle 16 through the tubular roll element 40 and by then positioning the preassembled bearings onto the hexagonal end portions 18 and 20 of the axle. After this has been done, the outer bearing races 34 of the respective bearings may then be moved into tightly received relationship within the respective end portions of the roll element 40. The axle structure 16 will then be trapped between the inner bearing races of the respective bearings and upon slight axial movement of the axle in either direction, the stop surfaces 24 or 26 will engage the respective inner bearing races and further movement of the axle will be prevented. Thus, it is not necessary to take special precautions to prevent sliding of the axle structure as in the case of conventional conveyor axle and roll assemblies because it is not possible for the axle to move completely within the roll and become disassembled from the respective inner bearing races. Thus, the labor ordinarily required to thread the axle through the inner bearing races is eliminated and the commercial feasibility of the conveyor roll structure of the present invention is thereby effectively enhanced. After the conveyor axle bearing and roll structures have been brought into assembly as described above, the hexagonal end portions 18 and 20 of the conveyor axle 16 may simply be dropped downwardly into opposed slots 46 that are defined in the respective side frames 12 and 14 in the manner illustrated in FIG. 4. It is not necessary to provide stop pins, additional side stop plates or other stop structure to preclude undesirable movement of the axle relative to the roll or conveyor frame structures.

It is also considered appropriate to provide the trapped-axle type conveyor axle and roll assembly of the present invention for free-hole type conveyor installation. According to the present invention, such may be conveniently accomplished in the manner illustrated in FIGS. 6-8. As shown in FIG. 6, a pair of conveyor side frames 50 and 52 are provided, each of which being formed to define noncircular conveyor axle openings 54 and 56, respectively. The openings 54 and 56 of the side frames may be of hexagonal configuration, if desired, so as to correspond with hexagonal extremities 58 and 60 of a conveyor axle structure illustrated generally at 62. The conveyor axle structure is formed of tubular stock of cylindrical configuration in the same manner as described above in connection with FIGS. 1-5 and thus defines an intermediate axle portion 64 having stop surfaces 66 and 68 defined at the transitions between the cylindrical intermediate portion 64 and the hexagonal end portions 58 and 60 of the axle.

A pair of bearings 70 and 72 are provided that may be identical as compared with the bearings illustrated in FIGS. 1 and 4. Each of the bearings includes an inner race 74 having a hexagonal opening 76 formed therein and adapted to receive the hexagonal extremity 60 of the axle 62. Bearing roller elements 78 establish a rotatable relationship between the inner bearing race 74 and an outer bearing race 80. A conveyor roll element 82 is provided having internal end surfaces 84 and 86 that are adapted to receive the outer bearing races 80 of each of the bearings in tightly fitting, nonrotatable relation therein.

Figure 2:
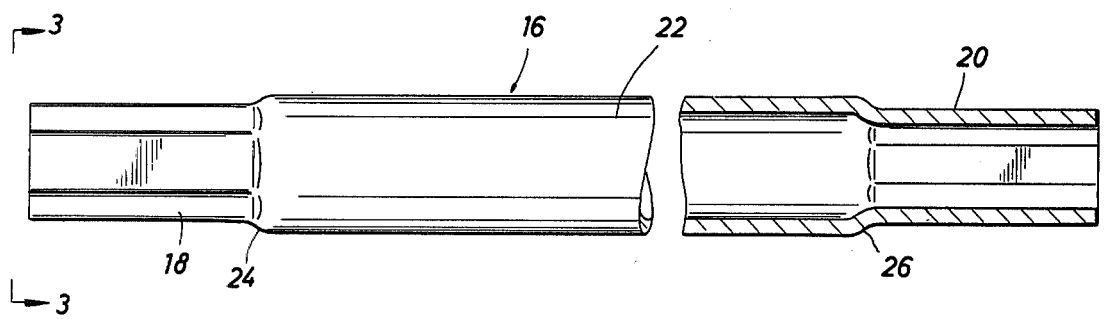
FIG. 2 is a view showing the axle structure of the conveyor roll assembly of FIG. 1, having a portion thereof broken away and illustrated in section.
Figure 3:
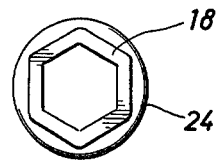
FIG. 3 is an end view of the axle structure of FIG. 2 taken along line 3—3 of FIG. 2 and illustrating the configuration of the end portion thereof in detail.

It will be evident from a comparison of FIGS. 1 and 6 that the principle difference between the conveyor roll and axle assemblies of these figures is defined by the conveyor axles. In FIG. 6, the conveyor axle is illustrated having one extremity 58 that may be substantially identical with respect to the extremities 18 and 20 of the axle as illustrated in FIG. 2. The opposite extremity 60 thereof is of greater length than extremity 58 and enables the conveyor axle member 62 to be moved to the right as shown in FIG. 6 to such extent that stop surface 68 is brought into engagement with the inner race of the bearing 72. When this occurs, the opposite extremity 58 of the conveyor axle will be withdrawn into but not completely through the internal hexagonal aperture of the inner bearing race, thus allowing the extremity 58 of the axle to be positioned in registry with the receptacle aperture 54 of the conveyor side frame 50. After this has been accomplished, the conveyor axle 62 is then moved to the left, thus inserting the extremity 58 of the axle into the free-hole type axle receptacle 54. Stop surface 66 at one extremity of the intermediate portion 64 of the axle will engage the inner bearing race of the bearing 70 and will prevent the opposite extremity 60 of the axle from being withdrawn into its bearing 72.

As shown in FIG. 7, the axle 62 is shown to be moved to its rightmost position allowing the axle extremity 60 to be extended through the axle receptacle opening 56 of the side frame 52. Simultaneously, axle extremity 58 is withdrawn into its bearing as described above, thus establishing sufficient clearance for pivoting of the conveyor roll to the appropriate horizontal position thereof. After the conveyor roll has been properly positioned with respect to the side frames, the conveyor axle 62 is moved to the left, thus inserting the axle extremity into the axle receptacle 54 of side frame 50. After this has been accomplished, a stop pin 88 may be inserted into an elongated opening 90 formed in the extremity 58 of the axle 62. Further axial movement of the axle in either direction will cause the stop pin 88 to engage either the side frame structure 50 or the inner race 74 of the bearing 70. The stop pin 88 will prevent sufficient movement of the axle to allow separation of either of the extremities from the side frame structures 50 and 52.

In view of the foregoing, it is evident that a novel conveyor frame and conveyor roll assembly is provided that effectively adapts application of the conveyor roll assembly to drop-in and free-hole type conveyor assembly and, in each case, provides a trapped-axle effect that minimizes axle movement within the conveyor roll structure and, thus, prevents inadvertent separation of the conveyor axles from conveyor side frame structure supporting the same. These features are effectively accomplished without necessitating provision of additional side plates or other mechanical structures on the conveyor side frames to limit undesired movement of the conveyor axle structures. The conveyor axles are formed of light weight, inexpensive tubular stock and thus minimize weight and cost of conveyor roll systems without sacrificing from the standpoint of strength and utility. The invention is effectively applicable to efficient metal forming operations such as swedging in order to manufacture axle extremities at a minimum of cost. It is therefore apparent that the present invention is one well adapted to attain all of the objects and advantages hereinabove set forth, together with other advantages which will become obvious and inherent from a description of the apparatus itself. It will be understood that certain combinations and subcombinations are of utility and may be employed without reference to other features and subcombinations. This is contemplated by and is within the scope of the present invention.

As many possible embodiments may be made of this invention without departing from the spirit or scope thereof, it is to be understood that all matters hereinabove set forth or shown in the accompanying drawings is to be interpreted as illustrative and not in any limiting sense.

What is claimed is:

1. A conveyor frame and conveyor roll assembly comprising:

a pair of elongated side frame elements being positioned in parallel spaced relation, said frame elements defining noncircular axle receiving openings defining at least two opposed flat surfaces positioned in parallel relation;

tubular roll means being positioned between said frame elements, said tubular roll means being a cylindrical sleeve defining bearing receptacles at each extremity thereof;

bearing means having inner and outer bearing races and bearing means establishing a rotatable relation therebetween, said outer bearing races being received in press fitted nonrotatable relation within said bearing receptacles, said inner bearing races defining hexagonal axle receiving aperture means;

tubular conveyor roll axle means being positioned within said tubular roll means and defining an intermediate tubular portion of generally cylindrical configuration and first and second hexagonal tubular extremities formed at the respective ends of said intermediate tubular portion, said hexagonal tubular extremities being receivable in linearly movable and nonrotatable mating relation within said noncircular axle receiving aperture means of said inner bearing races, said first tubular extremity of said conveyor roll axle means being of greater length than said second tubular extremity thereof, said first and second extremities being receivable in nonrotatable mating relation within said noncircular axle receiving openings of said frame elements, said second extremity of said conveyor roll axle means defining stop aperture means which, in the operative position of said conveyor roll axle means relative to said frame elements, is located between one of said frame elements and one of said bearing means, said intermediate tubular portion of said axle means being of larger diameter than the dimension of said axle receiving aperture means of said bearing means and being of sufficiently less length as compared to the spacing of said bearing means to render said axle means linearly movable within said tubular roll means sufficiently to substantially retract said second extremity thereof within said tubular roll means and said inner race of said bearing means and permit positioning of said second extremity of said axle means in registry with one of said axle receiving openings of one of said frame elements with said first extremity of said axle means positioned within one of said axle receiving openings of the opposite one of said frame elements; and stop pin means being receivable within said stop aperture means and, in said operative position, restricting linear mevement of said axle means relative to said one of said frame elements and said bearing means.

2. A method of manufacturing and assembling a conveyor incorporating a pair of side frame members maintained in fixed and spaced relation and having noncircular axle receiving openings extending therethrough, said conveyor incorporating conveyor rolls having bearings at each extremity thereof and having a tubular axle having an enlarged intermediate portion defining stop shoulders at each end thereof and first and second noncircular extremities, said first extremity being of greater length than said second extremity and said second extremity defining stop aperture means receiving stop pin means, said method comprising:

cutting a length of tubing from a section of cylindrical hollow tubing to form said axle;

swaging the end portions of said length of tubing a sufficient distance to form said noncircular extremities of said axle;

maintaining said side frame members in said fixed and spaced relation;

placing one of said bearings within one end of said conveyor roll;

inserting said axle through said conveyor roll and extending one of said first and second extremities of said axle through and in nonrotatable relation with said one of said bearings;

positioning the other one of said bearings in assembly within the opposite end of said conveyor roll and in nonrotatable relation with the other of said bearings;

moving said axle linearly within said conveyor roll and said bearings positioning one of said stop shoulders in engagement with one of said bearings and positioning said second extremity of said axle in retracted relation within one of said bearings and extending said first extremity of said axle from the other one of said bearings;

extending said first extremity of said axle through one of said openings of one of said side frame members with said axle being in inclined relation therewith;

pivoting said axle about said one of said axle openings sufficiently to position said second extremity of said axle in registry with an axle opening of the other of said side frame members;

moving said axle linearly within said conveyor roll sufficiently to extend said second extremity through said axle opening of the other of said side frame members and positioning said stop aperture means between said other of said side frame members and one of said bearings; and inserting said stop pin through said stop aperture and in locked relation with said axle, said stop pin limiting relative movement of said axle with respect to said conveyor roll.

3. The method of claim 2, wherein:

said swaging of said end portions of said length of tubing forms said axle to define extremities of hexagonal configuration.

* * * * *